US008562484B1

United States Patent
Nedorezov et al.

(10) Patent No.: US 8,562,484 B1
(45) Date of Patent: Oct. 22, 2013

(54) METHOD AND APPARATUS FOR STARTING A TURBOCHARGED ENGINE IN A HYBRID VEHICLE

(75) Inventors: Felix Nedorezov, Rochester Hills, MI (US); Hong Jiang, Birmingham, MI (US); Matthew John Shelton, Grosse Ile, MI (US); Roger Lyle Huffmaster, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/465,346

(22) Filed: May 7, 2012

(51) Int. Cl.
*B60W 10/08* (2006.01)
*F02D 23/00* (2006.01)

(52) U.S. Cl.
USPC .................................................. 477/5; 477/32

(58) Field of Classification Search
None
See application file for complete search history.

(56) References Cited

U.S. PATENT DOCUMENTS

| | | | |
|---|---|---|---|
| 6,392,380 B2 | 5/2002 | Furukawa et al. | |
| 6,593,713 B2 | 7/2003 | Morimoto et al. | |
| 8,464,529 B2 * | 6/2013 | Nedorezov et al. | 60/611 |
| 2004/0055800 A1 | 3/2004 | Katou et al. | |

* cited by examiner

*Primary Examiner* — Dirk Wright
(74) *Attorney, Agent, or Firm* — David B. Kelley; Brooks Kushman P.C.

(57) ABSTRACT

A vehicle with a modular hybrid transmission that has a combustion engine including a turbocharger and an e-machine use barometric pressure, road grade, and estimated vehicle mass to develop a turbo lag estimate. If it is determined that undesirable turbo lag is likely, the system opens a disconnect clutch between the engine and the e-machine and the engine is started independently of the e-machine. The e-machine is then used to launch the vehicle while the engine is started.

19 Claims, 3 Drawing Sheets

METHOD AND APPARATUS FOR STARTING A TURBOCHARGED ENGINE IN A HYBRID VEHICLE

TECHNICAL FIELD

This disclosure relates to hybrid vehicles that have a turbocharged combustion engine and an electric traction motor that cooperate to provide torque to drive the vehicle based upon a control algorithm for starting the engine with either a starter motor or the electric traction motor.

BACKGROUND

Vehicle manufacturers are developing hybrid vehicles to meet the demand for more fuel efficient vehicles. One configuration for a hybrid vehicle may be referred to as a Modular Hybrid Transmission (MHT) vehicle design. A MHT offers substantial fuel economy improvement by using electric drive for vehicle propulsion and regenerative braking. In a MHT vehicle, a motor is operatively connected between a conventional automatic step ratio transmission and the engine. The motor is attached to the transmission impeller or input shaft. The engine is selectively disconnected from the traction motor and the transmission by a "disconnect clutch". The disconnect clutch allows a vehicle to be driven in an electric mode using only the traction motor, in a hybrid mode with both motor and the engine propelling the vehicle, or in a conventional mode with the vehicle being propelled by the engine only.

Turbocharged engines are used to provide improved fuel economy while improving acceleration and drivability. Turbocharged engines allow designers to reduce engine size while still maintaining acceptable power for vehicle launch by boosting intake manifold pressure. Conventional turbochargers are known to have "turbo lag" until the turbocharger achieves a certain minimum speed to develop increased intake manifold pressure or boost. The engine can only obtain the minimum speed with sufficient exhaust gas flow that boosts the intake manifold pressure. Turbo lag is very pronounced at high altitudes because reduced barometric pressure and reduced oxygen concentration increases the amount of time for the exhaust gas pressure to build. Turbo lag also increases if the vehicle is carrying or towing a large load, such as when the vehicle is towing a trailer. Road grade may also contribute to turbo lag, such as when the vehicle is climbing a hill.

Turbo lag becomes an even bigger problem if the engine drives an MHT vehicle having a torque converter. Torque converters have a "stall speed" at which the converter input or impeller must spin for the torque converter to develop sufficient torque to move the vehicle. "Loose torque converters" are used to allow for high stall speeds and associated torque multiplication to facilitate vehicle launch at high altitudes. However, a loose torque converter incurs a fuel economy penalty and limits engine downsizing. Turbo lag can be exacerbated to the point where at high altitude it can take several seconds for a vehicle having a small turbocharged engine to accelerate even on level grade surfaces. Turbo lag at high altitudes becomes even greater if the vehicle is moving uphill or pulling a trailer.

SUMMARY

Vehicles with a turbocharged engine and a MHT configuration with a torque converter are provided with a vehicle control strategy to address the turbo lag problem at high altitudes. The motor's performance is independent of barometric pressure. A Powertrain Control Module (PCM) through a dedicated sensor or using a Manifold Air Pressure (MAP) sensor under certain conditions can either measure or infer barometric pressure. The PCM can also measure or estimate vehicle mass (including any trailer mass) and can also provide road grade information. A corresponding vehicle launch strategy is activated if the combination of barometric pressure, vehicle mass, and road grade is such that significant turbo lag is expected. The vehicle controller adjusts the battery management strategy and maintains higher available SOC for vehicle launches to facilitate the vehicle launch strategy.

MHT transmissions are equipped with a disconnect clutch that is selectively actuated to separate the engine from the transmission. The vehicle controller calculates the available torque from the motor. If driver demand torque is greater than the available torque (for the given SOC) the controller may start the engine and close the disconnect clutch to combine the engine torque and the motor torque.

In the proposed strategy, the engine may be started while the disconnect clutch is not applied if significant turbo lag to be expected. The 12 V starter may be used to start the engine instead of the motor providing the starting torque through the disconnect clutch that is usually used to start the engine.

Alternatively, the engine could be bumped to start by applying the disconnect clutch to crank the engine and then opening the disconnect clutch to spin the engine without any load. The vehicle may be launched with the motor during engine start and the step ratio transmission may be commanded to stay in low gear thigh gear ratio) to maintain a higher motor speed (and impeller speed) that is sufficient to develop turbo boost.

Engine speed is increased to cause the engine to spin up to a synchronous speed with the motor. The disconnect clutch can be closed when the difference between the engine speed and the motor speed is within an allowable range. The disconnect clutch torque capacity can be used to prevent the engine from exceeding the synchronous speed. The disconnect clutch torque capacity can be controlled to maintain sufficient rise of the engine speed while preventing the engine from over speeding. The transmission ratio control can be returned to a normal strategy once the disconnect clutch is closed.

During a high altitude launch or when launching with a trailer load, the torque converter should be maintained in an open state to provide maximum torque multiplication. Applying this strategy allows application of "tighter" torque converters than would be otherwise possible. Launch at any altitude may be facilitated by allowing the engine to spin to create turbo boost during launch. These launch strategies reduce turbo lag at high altitudes and also improve overall fuel economy by allowing the use of tighter torque converters.

The vehicle controller attempts to maintain sufficient battery SOC to facilitate motor launches. The vehicle controller may command battery charge even when under normal conditions it would not do so when conditions for excessive turbo lag are detected.

According to another aspect of this disclosure a method is disclosed for operating a vehicle having a motor between a transmission and an engine. The motor and the engine may be connected through a clutch that selectively connects the motor and the engine. The vehicle may have an accelerator pedal including a pedal position sensor that provides a pedal position signal. The pedal position signal is provided to a controller when the motor is operating and the engine is stopped. A starter motor may be provided to start the engine when the pedal position signal is greater than a threshold.

Engine speed is increased to within a calculated range of speed relative to the motor and the clutch is applied when the engine speed is within the calculated range.

According to another aspect of this disclosure, a system is disclosed for starting an engine of a vehicle that has a motor that is selectively coupled to the engine by a clutch. The system comprises an engine control module, a pedal position sensor that provides a pedal position signal to an engine control module, and a starter motor actuated by the engine control module based upon the pedal position signal. The engine control module sends a clutch apply signal to the clutch to apply the clutch when the engine speed is within a predetermined range of the motor speed.

The pedal position sensor may provide the pedal position signal to the engine control module when the pedal position exceeds a threshold minimum value. A motor speed signal and an engine speed signal are compared to each other and the clutch is applied when the motor speed signal and the engine speed signal are within a calibrated threshold difference. The motor speed signal and the engine speed signal may be monitored after the clutch is applied and the pressure applied by the clutch is increased to lock-up the clutch. The engine control module may send a maximum torque application signal to the motor before the starter motor is actuated.

The above aspects of this disclosure and other aspects will be better understood in view of the attached drawings and the following detailed description of the illustrated embodiments of the disclosure.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the present invention.

Figure 1A:
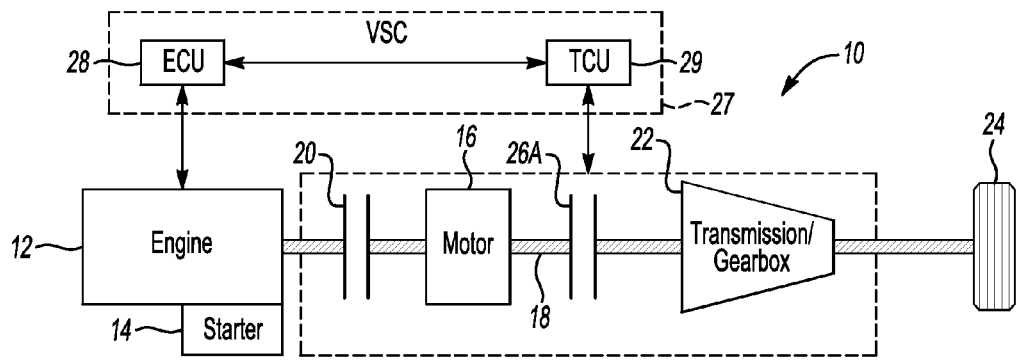
FIG. 1A is a diagrammatic view of a modular hybrid transmission system for a hybrid vehicle that does not include a torque converter.
Figure 1B:
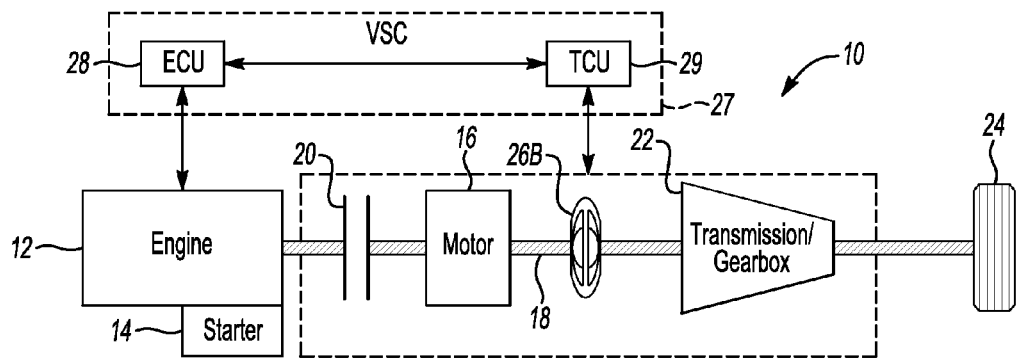
FIG. 1B is a diagrammatic view of an alternative embodiment of a modular hybrid transmission system for a hybrid vehicle that includes a torque converter.

Referring to FIGS. 1A and 1B, a modular hybrid transmission 10 is shown in a diagrammatic form. An engine 12 is operatively connected to a starter 14 that may be used to start the engine 12 when additional torque is needed. An electrical machine 16, or traction motor, is operatively connected to a driveline 18. A disconnect clutch 20 is provided on the driveline 18 between the engine 12 and the motor 16. A step shift geared automatic transmission 22, or gear box, is also provided in driveline 18. Torque transmitted from the engine 12 and motor 16 is provided through the driveline 18 to the transmission 22 that provides torque to the wheels 24. As shown in FIG. 1A, launch clutch 26A is provided between the transmission 22 and the engine 12 and/or motor 16 to provide torque through the transmission 22 to the wheels 24. As shown in FIG. 1B, a torque converter 26B is provided between the transmission 22 and the engine 12 and/or motor 16 to provide torque through the transmission 22 to the wheels 24. While elimination of the torque converter is an advantage of the embodiment of FIG. 1A, the present disclosure is also advantageous in reducing vibrations in systems having a torque converter 26B like that shown in the embodiment of FIG. 1B.

The vehicle includes a vehicle system controller (VSC) for controlling various vehicle systems and subsystems and is generally represented by block 27 in FIG. 1. The VSC 27 includes a plurality of interrelated algorithms which may be distributed amongst a plurality of controllers within the vehicle. For example, the algorithms for controlling the MHT powertrain may be distributed between an engine control unit (ECU) 28 and a transmission control unit (TCU) 29. The ECU 28 is electrically connected to the engine 12 for controlling the operation of the engine 12. The TCU 29 is electrically connected to and controls the motor 16 and the transmission 22. The ECU 28 and TCU 29 communicate with each other and other controllers (not shown) over a hardline vehicle connection using a common bus protocol (e.g., CAN), according to one or more embodiments. Although the illustrated embodiment depicts the VSC 27 functionality for controlling the MHT powertrain as being contained within two controllers (ECU 28 and TCU 29) other embodiments of the HEV include a single VSC controller or more than two controllers for controlling the MHT powertrain.

Figure 2A:
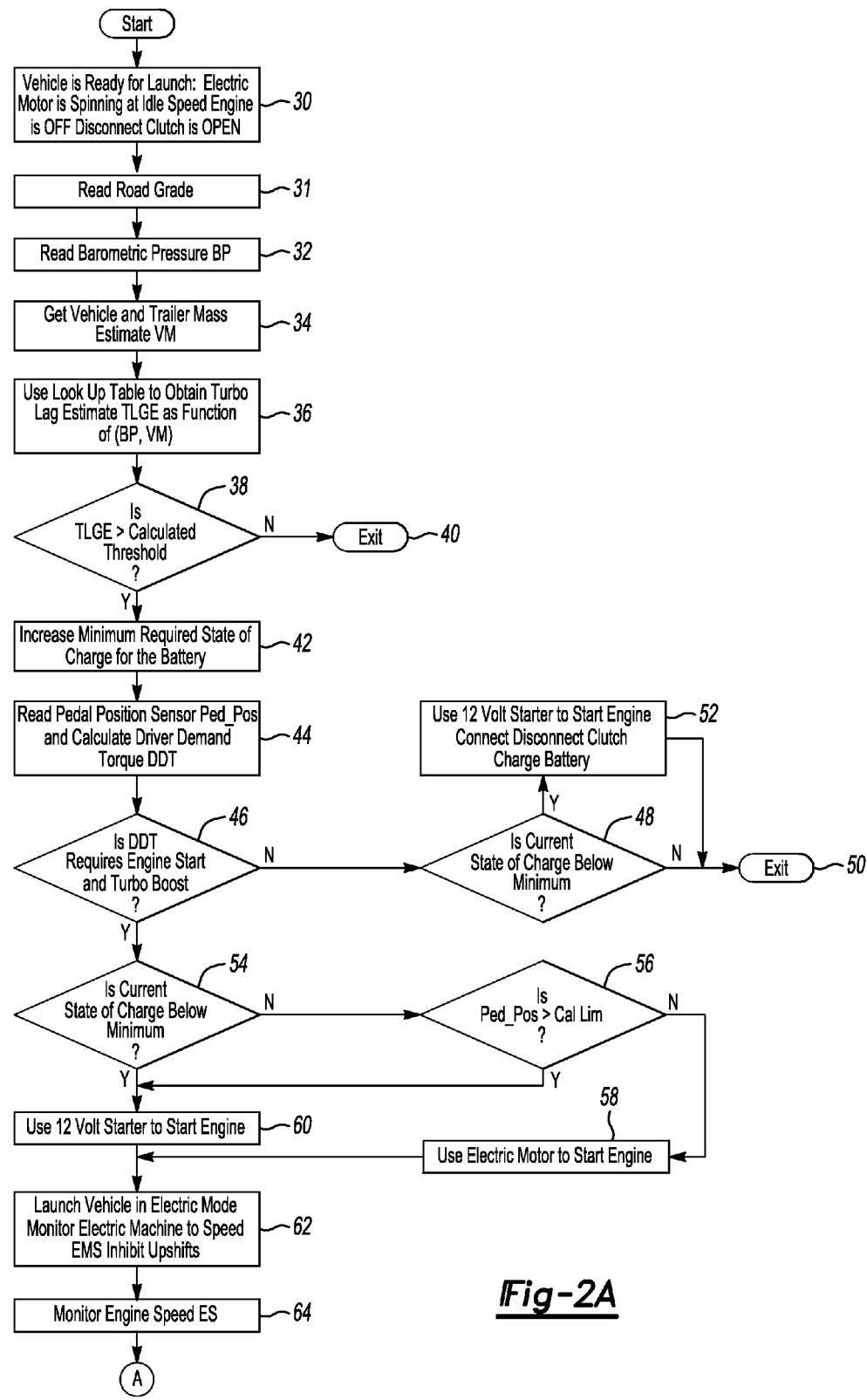
FIGS. 2A and 2B together provide a flowchart of an algorithm for controlling a starter for a combustion engine or a motor depending upon an estimated extent of turbo lag.
Figure 2B:
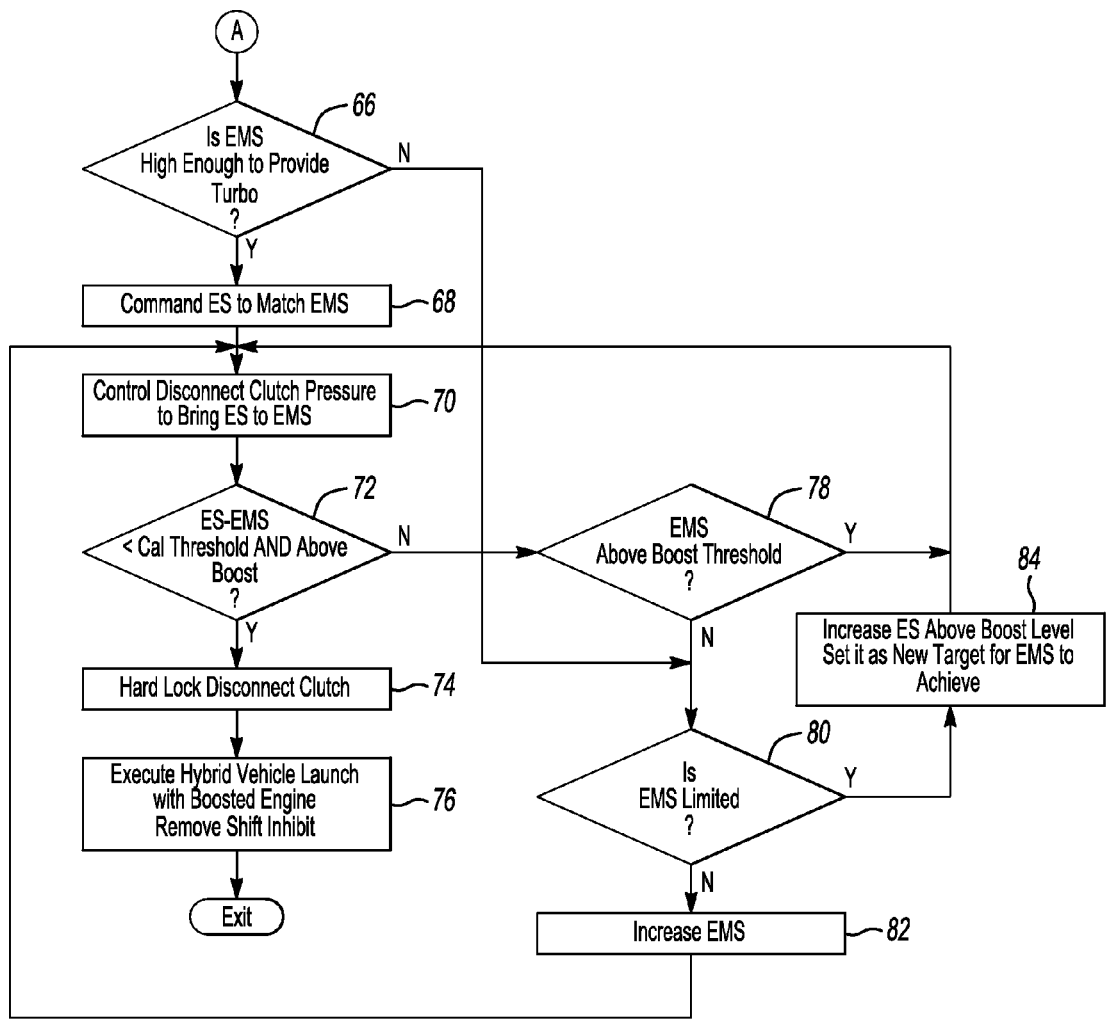

Referring to FIGS. 2A and 2B, a flowchart is provided for one embodiment of a system for controlling a vehicle equipped with a modular hybrid transmission that is equipped with a turbo charger. The system is intended to reduce the effect of turbo charger lag on vehicle operation.

At 30, the vehicle is ready for launch with the e-machine spinning at idle speed and the combustion engine off with the disconnect clutch open, or not applied. At 31, the road grade is read by a 3 axis accelerometer that may be part of the vehicle's stability control system. At 32, the barometric pressure is read by a barometric pressure sensor. At 34, the vehicle and trailer mass is estimated to arrive at a vehicle mass value. At 36, the barometric pressure value and vehicle mass value are compared to a look-up table, or stored value table, to obtain a turbo lag estimate value. In an alternative embodiment, a road grade value may also be included in the development of the turbo lag estimate value.

At 38, the turbo lag estimate value is compared to a calibratable threshold. If the turbo lag estimate value is greater than the threshold, it is determined that an unacceptable level of turbo charger lag is likely. If the turbo lag estimate value is less than the threshold, the system exits at 40.

However, if the turbo lag estimate is greater than the threshold, at 38, the system controller increases the minimum required state-of-charge for the battery, at 42. The pedal position sensor is read and the system calculates the driver demand torque at 44.

If the driver demand torque is high, the engine 12 must be restarted to satisfy the torque demand, at 46. If the driver demand torque is not sufficient to require an engine restart, the system may again determine whether the state-of-charge is below a minimum value, at 48. If the current state-of-charge is below the minimum value at 48, the system exits at 50. However, if the current state-of-charge is below the minimum, the 12 volt starter is used to start the engine and the disconnect clutch is applied to charge the battery, at 52.

If at 46 the driver demand torque requires an engine restart and turbo boost, the system again determines whether the current state-of-charge is below the minimum. If not, the system determines whether the pedal position is greater than a calibrated limit, at 56. If not, the e-machine is used to start the engine, at 58. If the pedal position is greater than the calibrated limit, at 56, the 12 volt starter is used, at 60, to start the engine. The vehicle is then launched at 62 in the electric mode. The system monitors the e-machine's speed and also inhibits upshifts in the transmission to maximize the e-machine speed. At 64, the engine speed is monitored to provide an engine speed signal. The engine speed signal may be obtained from a sensor or is otherwise available as an rpm output from the engine.

At 66, the controller determines whether the e-machine speed is high enough to provide a turbo boost by operation of the turbo charger. If the e-machine speed is high enough, the controller commands the engine to accelerate, at 68, until the engine speed matches the e-machine speed. When the engine speed is within a calibrated range of matching the e-machine speed, the disconnect clutch pressure is controlled to increase the engine speed to match the e-machine speed, at 70. The absolute value of the difference of the engine speed less the e-machine speed is compared, at 72, to a calculated threshold and above boost value. If the absolute value of the difference is less than the calculated threshold and above the boost, the system locks the disconnect clutch at 74. The vehicle is launched, at 76, with the combined torque from the e-machine and the turbocharged engine. A shift inhibit limitation is also removed, at 76.

If, at 72, the absolute value of the engine speed minus the e-machine speed is greater than the calculated threshold and boost value, it is determined whether the e-machine speed is above the boost threshold, at 78. If the e-machine is not above the boost threshold at 78, the controller then determines whether the e-machine speed is limited, at 80. If the e-machine speed is not limited at 80, the e-machine speed is increased at 82 and the system loops back and repeats the step of controlling the disconnect clutch pressure, at 70.

If the e-machine speed is determined to be limited, at 80, the system then increases the engine speed above the boost level which is set as a new target for the e-machine speed to achieve, at 84. The system then loops back to the step, at 70, of controlling the disconnect clutch pressure to bring the engine speed to the e-machine speed. Note, the boosted engine pulls up the e-machine if the e-machine is limited, at 84.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hybrid vehicle comprising:
    an engine having a starter and a turbocharger;
    a motor;
    a clutch operatively connecting the motor to the engine;
    a transmission connected to the motor; and
    a controller that actuates the starter when the engine is stopped and a barometric pressure signal is below a calibrated threshold, and launches the vehicle using the motor until an engine speed and a motor speed are within a calibrated threshold difference.

2. The vehicle of claim 1 wherein the controller starts the engine when a torque demand request signal is greater than the torque available from the motor.

3. The vehicle of claim 2 wherein the controller actuates the starter to start the engine and provide torque to the transmission when a state-of-charge of a battery is greater than a minimum state-of-charge value.

4. The vehicle of claim 2 wherein the torque demand request signal is less than torque available from the motor, and wherein the controller actuates the starter to start the engine with the clutch engaged to charge a battery.

5. The vehicle of claim 2 wherein the controller actuates the starter to start the engine in response to a battery state-of-charge signal being greater than a minimum state-of-charge value, and the torque demand request signal is greater than a calibrated minimum value.

6. The vehicle of claim 2 wherein the controller applies the clutch and commands the motor to start the engine in response to a battery state-of-charge signal exceeding a corresponding threshold, and the torque demand request signal being less than a calibrated minimum value.

7. The vehicle of claim 1 wherein the engine is started and the vehicle launches with the motor providing torque to the transmission with the clutch disconnected, wherein the controller engages the clutch when engine speed and motor speed are within a specified range.

8. The vehicle of claim 7 wherein absolute value of the difference between the engine speed and the motor speed is compared to a calibrated threshold difference value plus a boost speed, and wherein the clutch is locked up to provide torque from the motor and the engine in response.

9. The vehicle of claim 1 wherein the controller actuates the starter in response to a turbo lag estimate based on a vehicle mass value and the barometric pressure signal.

10. The vehicle of claim 9 wherein the starter is actuated in response to the turbo lag estimate exceeding a corresponding threshold.

11. The vehicle of claim 10 wherein the transmission is inhibited from upshifting when the motor speed is below a threshold speed at which the turbocharger provides increased pressure within an intake manifold.

12. The vehicle of claim 11 wherein the engine provides torque to the motor to increase the speed of the motor to above the threshold speed.

13. A method of operating a vehicle having a motor between a transmission and an engine, the motor and the engine being connected through a clutch that selectively connects the motor and the engine, the vehicle having an accelerator pedal including a pedal position sensor that provides a pedal position signal and a barometric pressure sensor that provides a barometric pressure signal, the method comprising:
    actuating a starter motor to start the engine when a turbo lag value is greater than a turbo lag threshold based on the barometric pressure signal;
    increasing engine speed; and
    applying the clutch when the engine speed is within a specified range of motor speed.

14. The method of claim 13 further comprising:
    starting the engine if a torque demand request associated with the pedal position signal is greater than torque available from the motor.

15. The method of claim 14 further comprising increasing pressure applied by the clutch to lock-up the clutch after the clutch is applied.

16. The method of claim 13 wherein the barometric pressure signal and a vehicle mass value are compared to a stored value table to provide a turbo lag estimate, and wherein the turbo lag estimate is compared to a threshold value that is used by the controller to determine whether to start the engine.

17. A system for starting an engine of a vehicle that has a turbocharger, the system including a motor that is selectively coupled to the engine by a clutch, the system comprising:
   an engine control module;
   a pedal position sensor that provides a pedal position signal to the engine control module;
   a barometric pressure signal provided to the engine control module; and
   a starter motor actuated by the engine control module based upon the barometric pressure signal and the pedal position signal;
   wherein the engine control module sends a clutch apply signal to the clutch to apply the clutch when an engine speed is within a predetermined range of a motor speed.

18. The system of claim 17 wherein the pedal position sensor provides the pedal position signal to the engine control module when the pedal position exceeds a threshold minimum value.

19. The system of claim 17 wherein the clutch is applied when a motor speed signal and an engine speed signal are within a calibrated threshold difference.

* * * * *